United States Patent [19]

Bratten

[11] Patent Number: 4,861,494

[45] Date of Patent: Aug. 29, 1989

[54] AUTOMATIC CYCLE CONTROL ARRANGEMENT AND METHOD FOR A PRESSURE FILTER

[76] Inventor: Jack R. Bratten, 5970 St. James Dr., West Bloomfield, Mich. 48033

[21] Appl. No.: 218,170

[22] Filed: Jul. 13, 1988

[51] Int. Cl.4 ............................................. B01D 29/02
[52] U.S. Cl. ..................................... 210/739; 210/741; 210/102; 210/106; 210/138; 210/143; 210/340; 210/350; 210/386; 100/51; 100/211
[58] Field of Search ................. 210/739, 741, 791, 88, 210/90, 98, 102, 106, 138, 143, 340, 350, 386, 400, 416.1, 401; 100/43, 50, 51, 211

[56] References Cited

U.S. PATENT DOCUMENTS

| | | | |
|---|---|---|---|
| 222,282 | 12/1879 | Kidd | 216/416.1 |
| 316,925 | 4/1885 | Vogel | 210/340 |
| 4,430,231 | 2/1984 | Bratten | 210/783 |
| 4,568,460 | 2/1986 | Bratten | 210/387 |
| 4,721,040 | 1/1988 | Mau | 100/211 |

Primary Examiner—Peter Hruskoci
Assistant Examiner—Christopher Upton
Attorney, Agent, or Firm—John R. Benefiel

[57] ABSTRACT

A pressurized filter is disclosed of the type including a filter media layer disposed in a filter chamber which is pressurized with a feed layer to cause filtering flow therethrough, and a diaphragm in the chamber operated to dewater the chamber after each cycle of operation, featuring a total volume totalizer measuring the volume of liquid inflow required to operate the diaphragm during each dewatering cycle, the duration of the next filtering cycle adjusted in a direction to increase or decrease the cycle duration so as to increase or decrease the accumulation of filtered solids to achieve on optimal accumulation. A plurality of filter units are stacked and organized into independently operated sets, enabling continuous filter operation by alternate cycling of each set.

6 Claims, 3 Drawing Sheets

AUTOMATIC CYCLE CONTROL ARRANGEMENT AND METHOD FOR A PRESSURE FILTER

FIELD OF THE INVENTION

This invention concerns filters and more particularly automatic control arrangements for pressure filters of the type adapted to be alternately cycled between a filtering operation and an intermittent filter cake removal phase of operation.

DESCRIPTION OF THE PRIOR ART

This invention concerns pressurized filtration apparatus of the type described in U.S. Pat. No. 4,568,460 entitled "Filter Apparatus and Method" of the present inventor and U.S. Pat. No. 4,430,231 entitled "Filtering Apparatus and Method" also granted to the present inventor.

This type of filter incorporates a filter housing into which a liquid to be filtered is introduced under pressure. The filter housing defines a filter chamber, subdivided by a filter media layer into high and low pressure regions, and a filtering flow is induced through the filter media layer. The filtered liquid is collected in the low pressure region for return to the system by trays located beneath the media layer.

The filter media layer comprises a porous filter belt, which is movable into and out of the housing through entrance and exit openings, to enable the cake removal process to be accomplished.

The filter apparatus described in U.S. Pat. No. 4,430,231 features a particular sealing design which is effective to create a selectively operable high pressure seal at the entrance and exit openings for the filter belt. Together with the remaining structural features of the filter, this sealing arrangement enables a relatively high pressure filtering process to be carried out in the filter chamber, which in turn enables difficult filtering operations to be successfully carried out, in which fine solids suspended in a liquid are removed at reasonably rapid rates.

The seals in this design comprise hose segments extending across each exit and entrance opening which are hydraulically inflated to seal against the adjacent surfaces of the filter belt and housing.

Such pressure filters using movable belts are often provided in a vertically stacked array, and typically, in such arrangements all of the filter belts are simultaneously caused to be moved in and out of the filter chamber during the cake removal phase of the filter cycle.

In U.S. Pat. No. 4,568,460 there is disclosed an arrangement for independent actuation of the filter belt associated with each filter in a stacked array.

In these filters, a diaphragm is inflated in the filter chamber preparatory to a filter cake removal cycle, which causes the diaphragm to force out the liquid remaining in the chamber after inflow of feed liquid is discontinued. The diaphragm is located above the filter media layer in the high pressure region of the filter chamber, and a fluid under pressure is introduced into a space above the diaphragm such as to cause the diaphragm to move or distend in a direction so as to force the liquid remaining in the chamber through the filter media layer. The diaphragm eventually moves into contact with the filter cake itself, and pressure is continued to be exerted thereafter by the diaphragm, compressing the filter cake to remove a major portion of liquid entrapped therein.

When such filtering apparatus is automatically controlled, the filtering cycle is of a duration calculated to maximize the operating efficiency of the apparatus. That is, for each situation, the various parameters determine an optimum duration of the filtering cycle for maximum efficiency.

As the filter cake accumulates, the filtering action slows as the liquid to be filtered is required to pass through an ever deeper thickness of the filter cake, such that the flow rate therethrough is reduced correspondingly with increasing accumulation of the filter cake.

On the other hand, the filter cake removal phase of the filter cycle amounts to "down" time for the filtering apparatus, of a length of time dependent on the time required to go through the entire filter cake removal process, including the chamber dewatering and filter cake squeeze stages. To this must be added the time required for the depressurization of the seals, any cake and/or belt washing procedures, air blowing through the filter cake, the movement of the filter media belts so as to transfer the filter cake out of the chamber, the scraping and cleaning of the filter media belts, and also the resealing and repressurization of the system preparatory to initiation of another filtering cycle.

Depending on the nature of the filtrate and various other parameters, there is a filter operation duration of maximum or nearly maximum efficiency which best balances these factors to achieve optimal results. The duration of each period of filter operation is typically maintained either by measuring the total volume of filtered liquid for each cycle and/or by a timer to achieve such predetermined maximum efficiency.

However, there often occurs variations in the quantity of solids carried within each volume of the liquid to be filtered, particularly over the long time periods in which such filtering apparatus is typically operated.

Accordingly, if the filter operation cycle is of a fixed time duration or volume, the cake thickness accumulated within each such period will vary for filtering cycles in which the solids density in the feed liquid varies significantly.

It is desirable that such filters operate under automatic control such as to eliminate the need for an operator to monitor the operation of the filter over these typically long operating periods, and to manually adjust the cycle duration as the slurry density varies.

There have heretofore been employed various electronic and/or optical sensors to detect changes in slurry density, but these devices are sensitive, costly, and relatively unreliable.

Another undesirable feature of multiple unit filtration apparatus is the complete shut down of the filter apparatus necessitated by the simultaneous cycling of each of the filtering units incidental to the need for periodic removal of the accumulated filter cake. With filter belt pressurized filters, each filtering apparatus in the past has been cycled simultaneously in the alternate filtering and cake removal operations. It would be advantageous if independent alternate cycling of such multiple filters could be accomplished so as to avoid down time of the filtering apparatus.

An additional advantage would lie in the more efficient utilization of the filter feed pumps, since smaller pumps could be employed to continuously supply feed liquid.

Accordingly, it is an object of the present invention to provide an automatic cycle control arrangement for filtering apparatus of the type described in which the effect on the operating effiency of variations in the slurry or feed liquid is automatically compensated for so as to maintain an optimal cycle over long periods of filter operation without the use of density sensors or requiring the intervention of an operator.

It is a further object of the present invention to provide a filtering apparatus comprised of a plurality of filtration units, each of the type described in which staggered filtration cake removal cycles are enabled so as to avoid down time of the filtering apparatus, and to enable substantially continuous utilization of filtration liquid circulation pumps, and other apparatus required for carrying out the various cycling steps in the filter operation.

SUMMARY OF THE INVENTION

The present invention comprises an improvement to filter apparatus of the type including a filter housing, defining a filter chamber, into which is directed the slurry liquid to be filtered.

In this arrangement, a filter media layer, comprised of a porous filter belt, extends into and out of the filtering chamber, with sealing means provided to seal the filter media layer to the housing at the entrance and exit openings. This enables pressurization of the slurry to cause flow through said filter media layer from a high pressure region to a low pressure region separated by the filter media layer.

A distensible diaphragm is mounted in the high pressure region above the filter media layer, and an arrangement is provided for selectively introducing fluid under pressure behind the diaphragm, after infeed of liquid is discontinued preparatory to a cake removal operation, causing it to move to displace the liquid remaining in the high pressure region, through the filter media layer. Thereafter, pressure is maintained behind the diaphragm, squeezing the filter cake to remove residual liquid. The filter media layer seals are relieved and transport of the belt occurs to move the filter cake out of the filter chamber, in order to enable removal of accumulated filter cake.

According to the improved cycle control arrangement and method of the present invention, flow totalizer means is associated with the means providing an inflow of fluid under pressure behind the diaphragm, generating a control signal corresponding to the total volume of such inflow. The control signal interreacts with control means such as to vary the duration of the next filtering cycle, in a corresponding direction to any variation of the diaphragm inflow volume occurring prior in the cake removal cycle.

Thus, as the inflow volume increases, the successive filtering cycles are of increased duration and are of decreased duration if the inflow is less than the previous cake removal cycle.

Accordingly, the filter cycle duration is controlled so as to tend to stabilize the depth of filter cake produced over the filtering cycle, notwithstanding variations in the rate of accumulation of filter cake caused by increased or decreased densities of solids to be removed in the slurry over the period of operation of the filtering apparatus.

According to another aspect of the control arrangement of the present invention, a plurality of such filtering units are stacked together, with independent control over the sealing and inflow to the filtering units in each of a pair of sets of such filtering units. This enables one set of filters to continue filtering operation while the other set is undergoing a cake removal phase of operation. The filter media belts in each set are operated independently of each other, as are the remaining components required to be variously activated during the respective filtering and cake removal phases of operation of the filter, i.e. the hydraulically operated hose seals are independently operated, as is the actuation of the diaphragms, the cake wash and air blow etc., in the filter units of the respective sets. Thus, the filtering apparatus does not experience a complete shut down during the cake removal phase of filter operation. Furthermore, a pair of relatively smaller size circulation pumps are utilized, operating continously, to get most efficient use from the equipment as compared to a larger pump in which the flow is intermittently utilized in the filtering apparatus.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
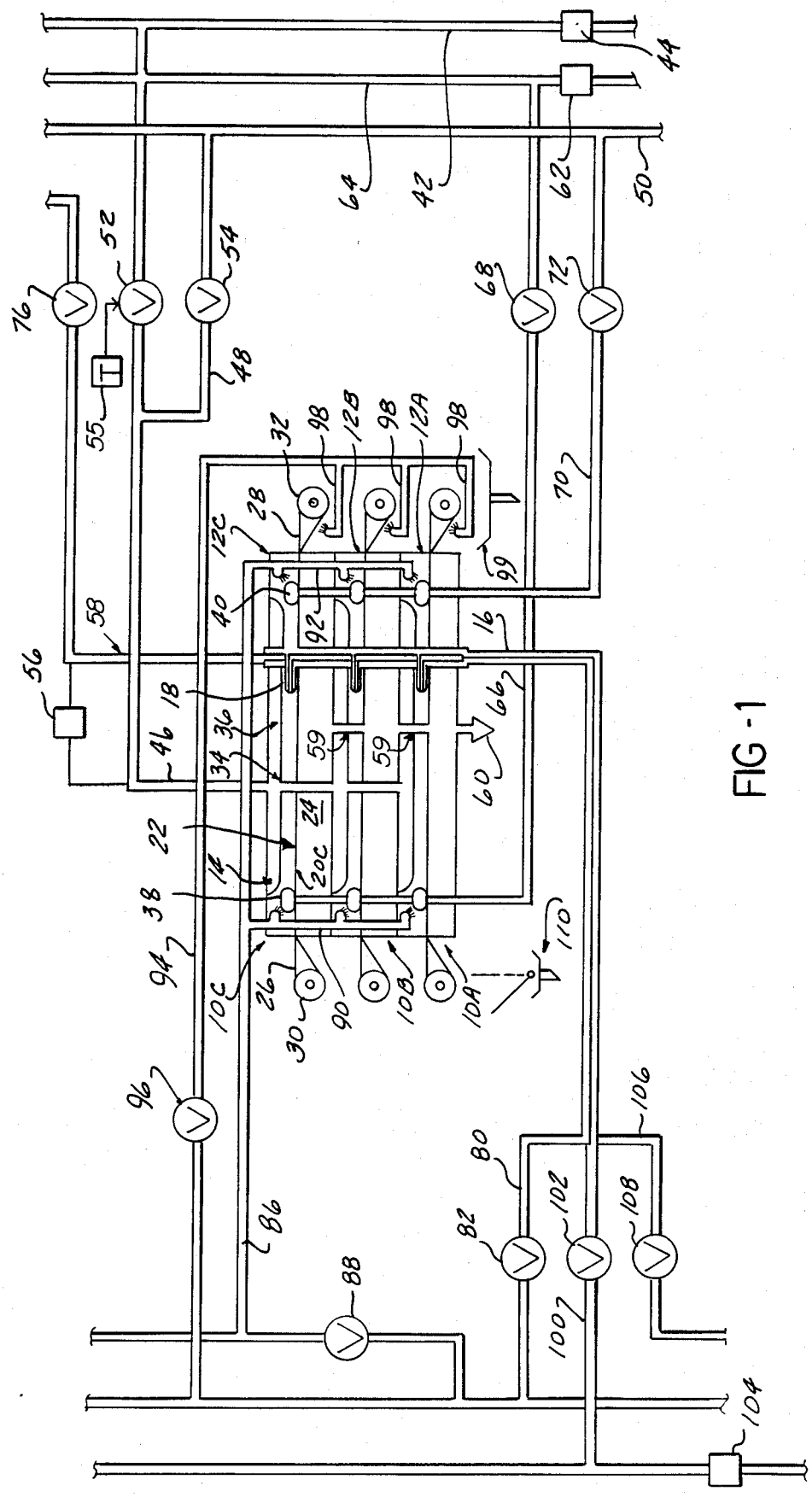
FIG. 1 is a fragmentary schematic view of one set of filter units in a filtering system incorporating a filtering control arrangement according to the present invention.
Figure 2:
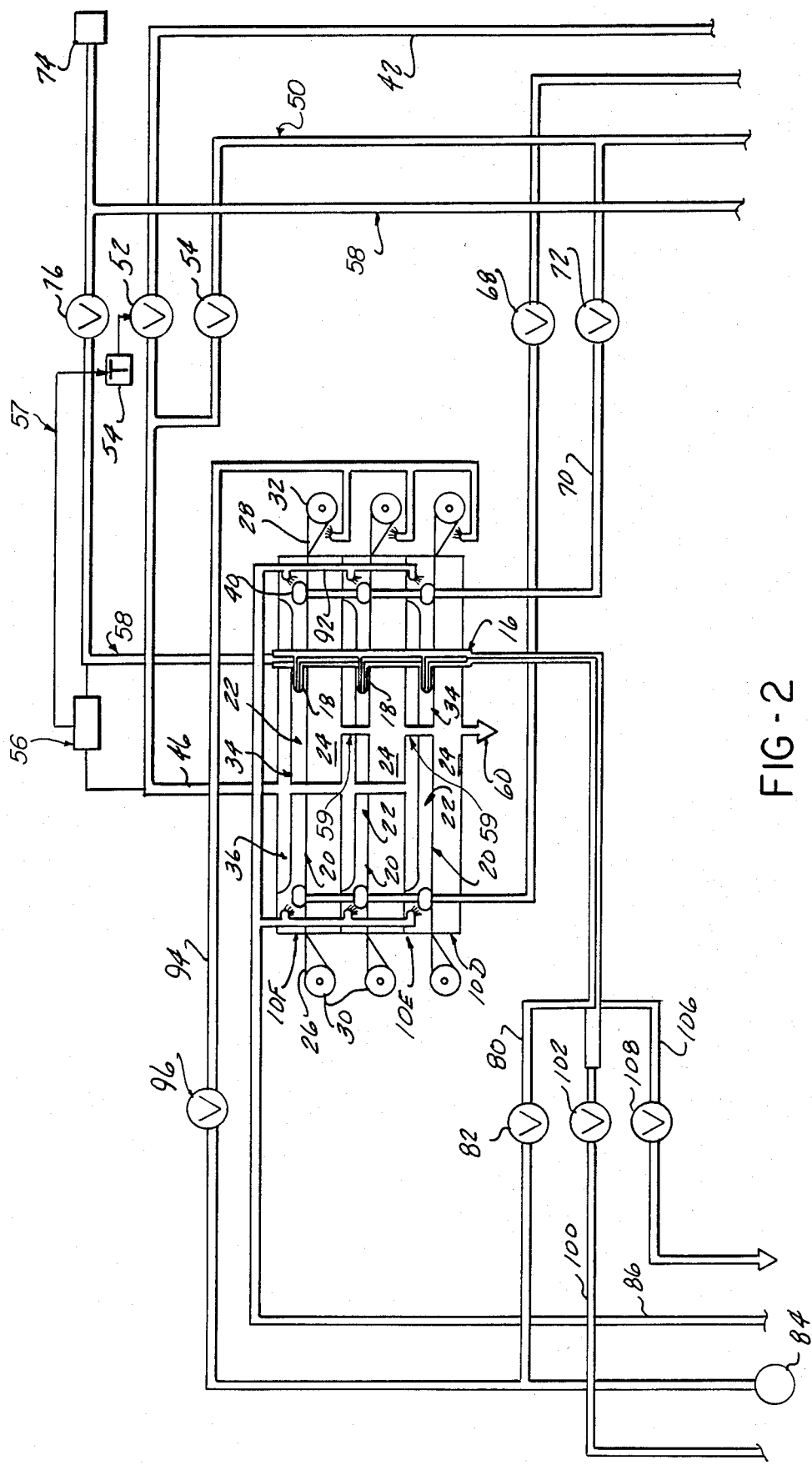
FIG. 2 is a fragmentary schematic view of the other set of filter units in the filtering apparatus incorporating the control arrangement according to the present invention.

Referring to the drawings, the filter system according to the present invention is comprised of a vertical array of a plurality of filter units 10A through 10F which although shown in separate sets in FIGS. 1 and 2 respectively, would physically be joined integrally in a stack as described in the aforementioned U.S. patents.

The various associated control components however are arranged to supply sets of the filter units independently, i.e., units 10A through 10C are cycled independently from units 10D through 10F.

Construction of each filter 10A thru 10F is generally according to the aforementioned U.S. Patents and those patents are hereby incorporated by reference in the present specification for a complete disclosure of the structural details thereof.

Each filter unit 10A through 10F includes a housing 12 defining a filtering chamber 14 therein into which is adapted to be directed the feed liquid or slurry to be filtered and infeed passage 16 communicates with a supply header and inlet tubes 18 connected to a respective chamber 14. Disposed in each filtering chamber 14 is a filter media layer, comprised of a looped filter media belt 20 which has a portion lying within the filter chamber 14, subdividing the filter chamber 14 into a high pressure region 22 and low pressure region 24.

Reference is made to U.S. Pat. No. 4,568,460 for the construction details of a suitable such filter belt.

Either ends 26, 28 of the filter belt 20 extend out of the housing 12 and pass about respective rollers 30 and 32, either one of which may be powered in order to provide a transport means for advancing the belt section within the housing 12 out of the housing during a cake removal cycle of each filter unit 10.

Disposed in each chamber 14A through 14F is a distensible diaphragm 34 comprising a movable member oriented so as to be able to move through the high pressure region 22 and into contact with filter cake deposited atop the portion of the filter belt 20 lying within the chamber 14.

Reference is made to U.S. Pat. No. 4,721,040 for the construction details of a suitable design for such a diaphragm, incorporated herein by reference. Movement of the diaphragm 34 compresses the filter cake and removes the residual liquid trapped therein preparatory to advancing movement of the filter belt 20 to carry the filter cake out of the housing 12.

In order to seal the housing 12 at the openings whereat the ends 26,28 of the filter media belts 20 enter and exit the housing on either side thereof, sealing means are provided. The sealing means comprises hose sections 38 and 40 which are inflatable so as to provide an effective high pressure seal against the belt 20 and the housing portions adjacent the openings through which the filter belt ends 26, 28 enter and exit the housing 12, as described in detail in the aforementioned U.S. Patents.

Figure 3:
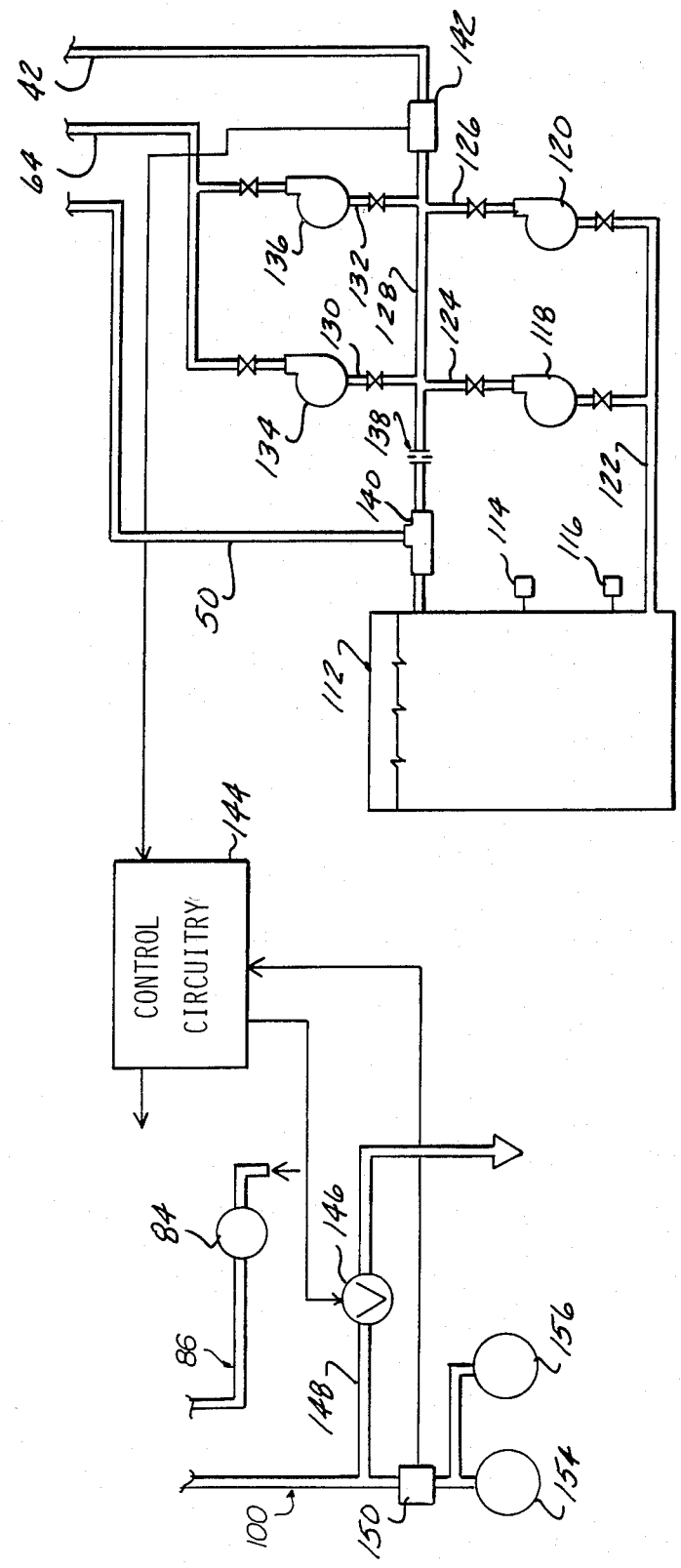
FIG. 3 is a fragmentary view of the feed pump and hydraulic power unit associated with the filtering system of FIGS. 1 and 2.

The rear face of each of the diaphragms is pressurized by a fluid under pressure directed into chamber 36, supplied via a passage 42 receiving a pressurized hydraulic fluid such as water from a source 44, to be described in reference with FIG. 3, communicating with a central header 46. Retraction of the diaphragms 34 is provided by a vacuum developed in a branch passage 48, connected to a vacuum source described in reference to FIG. 3.

Suitable control valves 52 and 54 control communication of pressurized fluid and vacuum to the chamber 36. The supply passage valve 52 is controlled by means of a timer 55, which is triggered by a signal generated by a differential pressure switch 56 measuring the pressure between the header passage 46 and in the high pressure region 22 of each housing comunicated via an air supply passage 58.

As the diaphragm 34 moves through the high pressure region 22, forcing liquid through the filter belt 20 and into the low pressure region 24, a relatively constant pressure is maintained in both the high pressure region 22, and the diaphragm chamber 36.

As the diaphragm 34 extends to contact the cake on the filter belt 20 and further motion is arrested, a higher pressure will exist in the diaphragm chamber 36 than in the high pressure region 22, providing an indication that contact therewith has been made. Accordingly, a differential pressure therebetween will develop which is sensed by the differential pressure switch 56, which in turn generates an electrical signal over line 57 triggering the timing of the timer 54 causing a predetermined squeeze interval to continue for several seconds to insure a period of continued squeezing of the filter cake to cause a further proportion of the slurry trapped therein to be expelled.

After the squeeze interval, the valve 52 is closed and valve 54 is opened preparatory to retraction of the diaphragm by causing a reverse flow out of chamber 36. The flow passing through the filter media belt 20 is received into the low pressure regions 24 which are placed in communication with each other by a cross passage 59, passing filtered liquid to a collection point 60.

The sealing hoses 38 and 40 are provided with a relatively higher pressure, i.e., 170 psi hydraulic fluid from a source 62, communicating with a supply passage 64, with a branch passage 66 receiving said high pressure liquid via a valve 68. Retraction of the hose seals 38 and 40 is enabled by means of a cross passage 70 and a valve 72, placed in communication with the vacuum source 142 via the passage 50.

Certain well known features are also depicted in FIGS. 1 and 2 including an air purge and water flush treatment of the filter cake prior to a filter cake removal cycle, as well as a belt wash arrangement for spraying of the filter belt 20 as transport in and out of the housing 12 is under way.

A cake air blow is accomplished by means of a source of compressed air 74 (FIG. 2) supplying passage 58 via air supply valve 76. Upon opening of valve 76, air is introduced into supply passage 58 which enters the high pressure regions 22 via nozzles 18, this step being initiated after the dewatering and squeeze cycle accomplished by the diaphragm 34.

Also provided, before such air blow, is a wash of the filter cake with clean plant water, introduced via headers 16 and inlets 18 from a feed passage 80 and cake wash valve 82 which receives a source of clean water from a supply pump 84. Supply pump 84 also supplies a branch passage 86 via a seal flush valve 88 which directs water to spray headers 90 and 92. Similarly, a branch passage 94 and belt wash valve 96 receive water from source 84 directed to spray heads 98 located adjacent beneath the belt portion return loops 28 extending about rollers 32.

The feed of slurry is received by supply passage 100 controlled by the feed valve 102. The slurry is supplied under pressure from a pumping source 104, also described in reference to FIG. 3.

A header drain valve and passages 106 and 108 are also provided to allow the escape of the liquid from the header 18 when the various supply passages are unpressurized. The belt wash drain pan 99 is provided to receive the cleaning spray collected from the belt portion 28 and rollers 32, and a discharge drip pan 110 is provided to receive drippage from the opposite belt portions 26 which is connected to a suitable drain (not shown).

The respective sets of filter units 10A through 10C and 10D through 10F are connected to receive process and feed liquids from common sources but are independently valved. Also, independent actuation of the rollers 30 and 32 allows independent operation of each set of filter units, both in the filtering mode and in the cake removal mode. Thus, with one set filtering, the other set may be undergoing a cake removal phase without resulting in a complete shut down of the filtering system as a whole.

It is understood that each of the valves, motors, etc., are controlled by conventional control circuitry, and that various indicator and fault signals would be included, as are well known to one skilled in the art.

FIG. 3 depicts certain of the particular features according to the present invention. The supply of hydraulic fluid to passages 42, 64 is provided by a hydraulic supply system including a tank 112, adapted to contain a predetermined volume of hydraulic fluid such as water disposed therein. A suitable level control switch 114 and a low level alarm 116 are provided. A pair of pumps 118 and 120 have their respective inputs connected via an inlet passage 122, at a relatively low level in the hydraulic tank 112, the output passage 124 and 126 of each pump 118 and 120 connected to cross passage 128.

Cross passage 128 connects the inlet side 130 and 132 of a pair of booster pumps 134 and 136 supplying passage 64 with the relatively higher pressure liquid required for the hose seals 38 and 40.

Cross passage 128 is also connected via a coupling 138 to an ejector 140 adapted to recirculate the hydraulic liquid into the tank 112, thereby developing a vacuum in line 50. The ejector 140 draws liquid therefrom to cause retraction of the hose seals 38 and 40 as well as the diaphragms 34, as described above. Cross passage 128 is also connected to passage 42 in which is disposed a volume flow totalizer means 142 which measures the total flow passing into passage 42 which in turn measures the total flow into the diaphragm chambers 36 during a dewatering-squeeze cycle thereof.

A suitable turbine type flowmeter, Model F-3-500 of Electronic Flo-Meters, Inc. of Dallas, Tex., generates a number of pulses per gallon (such as 56), which may be counted in a storage register to provide electronic signals corresponding to the total volume of flow needed to inflate the diaphragm 34 for each of two successive cycles. This signal is transmitted to the system cycle control circuit indicated generally at 144, which could include a hard wired circuit, or a suitably programmed microprocessor for operating the various valves etc., in conventional fashion. Control circuitry 144 also operates a filter bypass valve 146, which causes the slurry to be returned to avoid shut down of the pumps 118 and 120 upon discontinuing the supply of slurry to the filter units 10A through 10F.

The feed of liquid to be filtered via line 100 is normally controlled by either a timer or total volume flow measuring element 150 which interacts with the control circuit 144 to cause the valve 146 to open after either a predetermined filter cycle or after a predetermined volume of flow has passed into the filters. The duration is varied by the suitable control circuitry 144, according the concept of the present invention.

As the total flow measured by volume totalizer means 142 varies as determined by a comparison of successive flow volumes, the duration of the next filter interval is varied in a corresponding sense. The volume of flow to the diaphragm chambers 36 is inversely proportional to the volume of filter cake accumulated on the belt portions 20 after each filtering cycle. That is, with increasing filter cake accumulation, a reduced volume of liquid flow to the chambers 36 will result. The electronic signal corresponding to this liquid flow is transmitted to the control circuitry 144, which causes the duration of the next filtering cycle to be changed in correspondence with the changed volume of flow, so as to tend to increase or decrease the filter cake accumulation over the next filter cycle to produce the optimal accumulation.

The execution of this corrective process should be in accordance with well known control engineering principles to avoid over shoots and unstable cycles. For example, a calculated increase in the filter cycle duration is selected which would accomplish one half of the difference which is sought of an increased filter cake accumulation, in each corrective step, as will be understood by those skilled in the art.

It should be understood that in such filtering apparatus, for each application there is an optimal, most efficient depth of accumulation of filter cake in terms of accomplishing the maximum filtering volume for a given period of filter operation covering both cycles. That is, the accumulation of filter cake reduces filtering flow to a degree, i.e., the flow declines in correspondence thereto, to reduce the filter output. On the other hand, to cycle each of the filters to eliminate the filter cake requires a cessation of filtering activity of the particular filter units which are in this phase of operation.

There is a need to balance these two factors to achieve overall optimal efficency as is well known to those skilled in the art.

According the concept of the present invention a precalculated, predetermined filter cake depth is sought to be maintained, and if there is a variation in the slurry density occurring over time, the sensing of an increased or decreased volume flow to the diaphragm chambers 36 is relied on to detect this change and to automatically put in action a compensation by increasing or decreasing the filter cycle duration to achieve the optimum filter cake depth for each cycle of filtering activity.

Accordingly, the control arrangement according to the present invention will automatically tend to maintain such maximum effiency filtering cycle duration without the need for monitoring or intervention by a filter operator or the use of slurry density sensors.

It will also be appreciated by those skilled in the art that the use of independently cycled sets of filters within the array of filter units 10A through 10F accomplish an above recited object of the invention, in that the filtering apparatus will continue receiving slurry even during the cake removal cycle since one set is caused to undergo this cycle of operation, while the other set continues filtering operation and vice versa. A pair of relatively smaller circulation pumps 154 and can continuously operate to supply the slurry feed requirements rather than on-off cycling of larger size pumps.

I claim:

1. An improved automatic cycle control arrangement for a filter for filtering liquid in which there are changes in the quantity of filtered material per unit volume of liquid, said filter of the type having a housing defining a filter chamber adapted to be supplied with a liquid under pressure to be filtered under pressure, a filter media layer disposed in said filter chamber to subdivide said filter chamber into high and low pressure regions, means inducing a flow of said liquid from said high pressure region to said low pressure region to be filtered and collected after being filtered, a distensible diaphragm disposed in said filter chamber on the high pressure side of said filter media layer defining in part a diaphragm chamber therein, mean for periodically causing a volume of fluid flow into said diaphragm chamber to pressurize said diaphragm chamber so as distend said diaphragm against accumulated filter cake, said filter including a cycle control means for continuing filter operation for periods of predetermined duration alternated with periods in which filter cake removal occurs, the improvement comprising:

volume totalizer means totalling the volume of said fluid flow into said diaphragm required to compress said accumulated filter cake and generating a corresponding control signal; and, means responsive to said control signal indicating a change in said volume of fluid flow from cycle-to-cycle, to act on said cycle control means to cause a corresponding increase or decrease in the duration of the next period of filter operation to increase or decrease the accumulation of filter cake over the next cycle of filter operation, whereby the effect of changes in the quantity of filtered material per unit volume of said liquid on the rate of accumulation of filter cake automatically causes compensating increases or decreases in cycle durations.

2. The arrangement according to claim 1 wherein said filter media layer comprises a filter belt movable in and out of said filter chamber to carry away said filter cake after each of said filtering cycles and further including selectively operable sealing means sealing portions of said belt to said housing to allow pressurizing of said filter chamber during each filtering cycle.

3. The arrangement according to claim 2, further including a plurality of said filters mounted together in an array, each of said filters independently sealed and each of said belts independently movable of each other, said control arrangement enabling independent operation of at least two of said filters in said array whereby a filter cycle of one filter proceeds while cake removal is carried out on the other filter.

4. The arrangement according to claim 1 wherein said cycle control includes a differential pressure sensor detecting the difference in pressure between said high pressure regions and said diaphragm chamber as said diaphragm is moved to compress said filter cake, and timer means responsive to development of a predetermined pressure differential therebetween to continue pressurization of said diaphragm for a predetermined period thereafter.

5. A method of controlling the cycling of a filter of the type including a filter housing defining a filter chamber, a filter media layer disposed in said chamber to subdivide said chamber into high and low pressure regions, causing flow of liquid through said filter media layer to filter the same, a member disposed in said high pressure region of said filter chamber movable into engagement with filter cake deposited on said filter media layer to compress the same, means for causing a flow of pressurized fluid behind said member to cause said movement thereof, the improvement comprising the steps of:

measuring the total inflow of fluid required to move the movable member so as to compress the filter cake; and varying the duration of the next filter cycle in a direction corresponding with the measured volume of fluid inflow required to compress the filter cake deposited by the previous filter cycle, thereby increasing or decreasing the filter cycle so as to correspondingly increase or decrease the filter cake accumulation in the next filter cycle.

6. The method according to claim 5 including the initial step of determining the filter cake accumulation which maximizes the filter operating efficiency and controlling the filter cycle duration so as to obtain said filter cake accumulation during a filtering cycle.

* * * * *

UNITED STATES PATENT AND TRADEMARK OFFICE
CERTIFICATE OF CORRECTION

PATENT NO. : 4,861,494

DATED : August 29, 1989

INVENTOR(S) : Jack R. Bratten

It is certified that error appears in the above-identified patent and that said Letters Patent is hereby corrected as shown below:

Column 8, line 54 (Claim 1), "mean" should be --means--.

Signed and Sealed this

Thirty-first Day of July, 1990

Attest:

HARRY F. MANBECK, JR.

*Attesting Officer*  *Commissioner of Patents and Trademarks*